US009888369B2

(12) United States Patent
Lee et al.

(10) Patent No.: US 9,888,369 B2
(45) Date of Patent: Feb. 6, 2018

(54) SYSTEM FOR TRANSMITTING HETEROGENEOUS NETWORK-LINKED DATA AND METHOD THEREFOR

(71) Applicants: TW MOBIL CO., LTD, Seoul (KR); Se-yong Lee, Seoul (KR); Kyo-sik Hong, Gyeonggi-do (KR)

(72) Inventors: Se-yong Lee, Seoul (KR); Kyo-sik Hong, Ansung (KR)

(73) Assignee: TW MOBILE CO., LTD, Seoul (KR)

( * ) Notice: Subject to any disclaimer, the term of this patent is extended or adjusted under 35 U.S.C. 154(b) by 147 days.

(21) Appl. No.: 14/782,686

(22) PCT Filed: Apr. 8, 2014

(86) PCT No.: PCT/KR2014/003053
§ 371 (c)(1),
(2) Date: Oct. 6, 2015

(87) PCT Pub. No.: WO2014/168407
PCT Pub. Date: Oct. 16, 2014

(65) Prior Publication Data
US 2016/0073245 A1    Mar. 10, 2016

(30) Foreign Application Priority Data

Apr. 8, 2013  (KR) .................. 10-2013-0037993

(51) Int. Cl.
*H04M 3/00* (2006.01)
*H04W 4/20* (2009.01)
(Continued)

(52) U.S. Cl.
CPC .......... *H04W 4/20* (2013.01); *H04M 3/42025* (2013.01); *H04M 3/42136* (2013.01); *H04W 4/001* (2013.01); *H04W 4/12* (2013.01)

(58) Field of Classification Search
CPC ......... H04M 3/42025; H04M 3/42136; H04W 4/001; H04W 4/12; H04W 4/20
USPC ........ 455/410–411, 412.1–414.2, 418–422.1, 455/556.1–556.2, 562.1, 552.1, 550.1; 379/265.11, 88.17, 265.13, 88.01
See application file for complete search history.

(56) References Cited

U.S. PATENT DOCUMENTS

| 8,000,454 | B1 * | 8/2011 | Or-Bach ................ G06Q 20/10 379/100.14 |
| 8,054,952 | B1 * | 11/2011 | Or-Bach ................ G06Q 20/10 340/5.41 |

(Continued)

FOREIGN PATENT DOCUMENTS

| KR | 10-2007-0018474 A | 2/2007 |
| KR | 10-2009-0033503 A | 4/2009 |
| KR | 10-2011-0008641 A | 1/2011 |

*Primary Examiner* — Babar Sarwar
(74) *Attorney, Agent, or Firm* — Patent Office of Dr. Chung Park

(57) ABSTRACT

Provided are a system for transmitting interworking data in heterogeneous networks and a method thereof. The system for transmitting interworking data in heterogeneous networks and a method thereof capable of greatly improving convenience and reducing counseling time, by downloading and installing data transmission applications to a customer terminal and an ARS counselor terminal, respectively, allowing the ARS counselor to simply select specific data from complex and hard information upon ARS counseling in a state in which he/she sorts and stores in advance information to be transmitted as data upon the ARS counseling and transmit the selected specific data to the customer terminal, and allowing the remote counselor to control a page for the data transmitted to the customer terminal to be output.

16 Claims, 7 Drawing Sheets

(51) Int. Cl.
*H04W 4/00* (2009.01)
*H04M 3/42* (2006.01)
*H04W 4/12* (2009.01)

(56) References Cited

U.S. PATENT DOCUMENTS

| | | | | |
|---|---|---|---|---|
| 8,223,931 | B1* | 7/2012 | Lavian | G06Q 30/0251 |
| | | | | 370/250 |
| 8,572,303 | B2* | 10/2013 | Lavian | H04M 1/72527 |
| | | | | 710/15 |
| 8,917,823 | B1* | 12/2014 | Sacks | H04M 3/4938 |
| | | | | 379/67.1 |
| 2005/0207545 | A1* | 9/2005 | Gao | G06F 3/016 |
| | | | | 379/88.17 |
| 2008/0081662 | A1* | 4/2008 | Strandell | H04M 1/274516 |
| | | | | 455/557 |
| 2008/0226042 | A1* | 9/2008 | Singh | H04M 1/247 |
| | | | | 379/88.04 |
| 2009/0327061 | A1* | 12/2009 | Wren | G06Q 10/10 |
| | | | | 705/14.15 |
| 2010/0210245 | A1* | 8/2010 | Kim | H04M 3/42382 |
| | | | | 455/412.1 |
| 2012/0150978 | A1* | 6/2012 | Monaco | G06Q 10/107 |
| | | | | 709/206 |
| 2012/0329529 | A1* | 12/2012 | van der Raadt | G06F 1/1694 |
| | | | | 455/566 |
| 2013/0304657 | A1* | 11/2013 | Miller | G06Q 50/16 |
| | | | | 705/313 |

\* cited by examiner

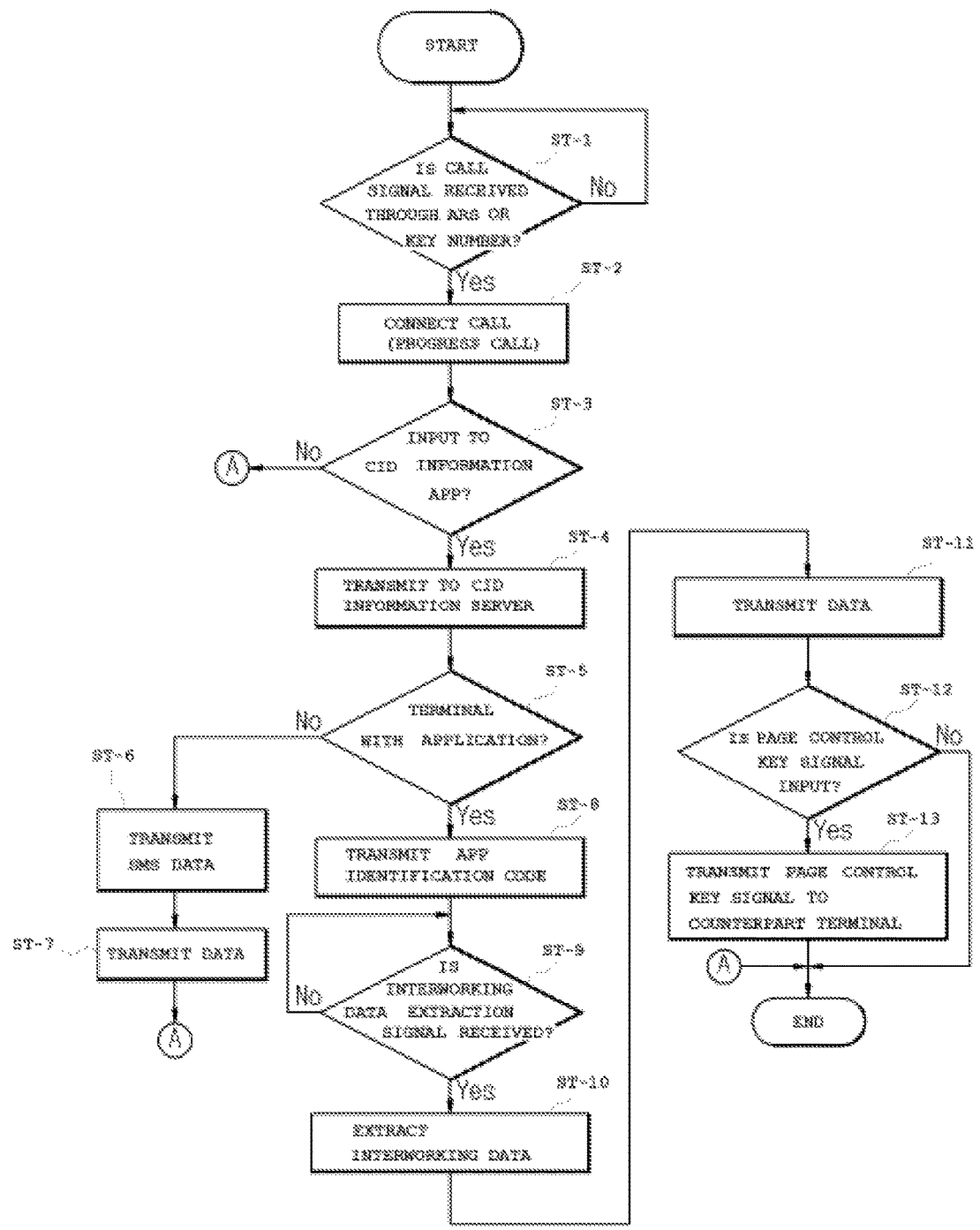

SYSTEM FOR TRANSMITTING HETEROGENEOUS NETWORK-LINKED DATA AND METHOD THEREFOR

CROSS-REFERENCE TO PRIOR APPLICATIONS

This application is a national Stage Patent Application of PCT International Patent Application No. PCT/KR2014/003053, filed on Apr. 8, 2014 under 35 U.S.C. §371, which claims priority of Korean Patent Application No. 10-2013-0037993, filed on Apr. 8, 2013, which are all hereby incorporated by reference in their entirety.

TECHNICAL FIELD

The present invention relates to a system for transmitting interworking data in heterogeneous networks and a method thereof, and more particularly, to a system for transmitting interworking data in heterogeneous networks and a method thereof capable of greatly improving convenience and reducing counseling time, by downloading and installing data transmission applications to a customer terminal and an Automatic Response System (ARS) counselor terminal, respectively, allowing the ARS counselor to simply select specific data from complex and hard information upon ARS counseling in a state in which he/she sorts and stores in advance information to be transmitted as data upon the ARS counseling and transmit the selected specific data to the customer terminal, and allowing the remote counselor to control a page for the data transmitted to the customer terminal to be output.

BACKGROUND ART

As well known in the art, with the recent development of information communication techniques, a development of information providing techniques which provide information on various fields to multiple subscribers through at least one host server via a wide area data communication network in real time has been actively conducted.

Based on the techniques, recently, peripheral techniques, such as a cache memory extension technique for more rapidly providing accurate information to subscribers and an information selection technique and a compression technique providing a more convenient access to taste and preference of subscribers are being developed. In addition thereto, industries have accelerated their paces in the development of various contents and solutions thereof.

Most of big companies construct an ARS system to more rapidly and easily transmit various types of information including A/S to customers. However, in order to construct the ARS system, huge costs are required. Therefore, for providing information, the big companies would depute ARS services to ARS service providing businesses which are professionally specialized in the ARS services.

However, in order to depute the ARS services to the ARS service providing businesses, a lot of costs are also required, and therefore small and medium-sized businesses may not frequently provide the ARS services.

Meanwhile, a considerable number of customers acquiring information by selecting items through a conventional ARS system may want to directly talk with a counselor. However, most of these customers may be senior citizens. Further, there may be a case in which a counselor should actually transmit slightly complex information to the customers.

For example, when a customer needs to perform self-diagnosis and self-manipulation by directly operating devices while talking over the phone or record information on the devices, however properly the ARS counselor transmits the information to the customer, the customer is not aware of the information. Therefore, there is inconvenience that the customer repeatedly tries to make a call with the ARS counselor several times.

In particular, when the information that the ARS counselor should transmit to the customers is slightly complex, these problems will be bigger and bigger.

DISCLOSURE

Technical Problem

In consideration of the above-mentioned circumstances, it is an object of the present invention to provide a system for transmitting interworking data in heterogeneous networks and a method thereof capable of greatly improving convenience and reducing counseling time, by downloading and installing data transmission applications to a customer terminal and an ARS counselor terminal, respectively, allowing the ARS counselor to simply select specific data from complex and hard information upon ARS counseling in a state in which he/she sorts and stores in advance information to be transmitted as data upon the ARS counseling and transmit the selected specific data to the customer terminal, and allowing the remote counselor to control a page for the data transmitted to the customer terminal to be output.

Technical Solution

In order to accomplish the above object, according to an aspect of the present invention, there is provided a system for transmitting interworking data in heterogeneous networks, including: an ARS server 8 configured to receive a call signal from a customer terminal 2 to connect any one of a plurality of ARS communication terminals 6 to the customer terminal 2; the customer terminal 2 configured to receive interworking data from an ARS counselor terminal 4 to be output on a screen with being connected to the ARS communication terminal 6 on voice communication; the ARS counselor terminal 4 configured to download and install data transmission applications from an interworking data management server 10, store the interworking data to be transmitted to the customer terminal 2 in advance, extract specific data by a data selection signal and transmit the extracted data to the customer terminal 2, and perform a remote output control of the interworking data which are output to the customer terminal 2; and the interworking data management server 10 configured to register the data transmission applications to be downloaded, and register the interworking data, which are authorized by a user and transmitted to a call counterpart terminal, to a user terminal to be transmitted.

Preferably, the interworking data include any one of English, terminologies, abbreviations, product brochures, or data which are requested by a predetermined number of users to register as ARS data.

Preferably, the interworking data include a company key number, an ARS call telephone number, or a person in charge telephone number.

Preferably, the interworking data include a plurality of wireless web pages.

Preferably, the interworking data management server 10 transmits the interworking data to the customer terminal 2 by the request of the ARS counselor terminal 4.

Preferably, the interworking data are transmitted only when the data transmission applications are installed in both of the ARS counselor terminal 4 which transmits data and the customer terminal 2 which receives the data.

Preferably, any one of the terminals in which the data transmission applications are installed may confirm whether the data transmission application is installed in a terminal which has a specific telephone number.

Preferably, the terminal with the data transmission applications installed therein is configured to confirm whether the data transmission applications are installed based on download installation information registered in the interworking data management server 10 or communication of the data transmission applications with the interworking data management server 10.

Preferably, if it is determined that the data transmission application is not installed in the customer terminal 2, the ARS counselor terminal 4 converts and transmits the interworking data which are web data into an SMS.

Preferably, when the company key number is set, the ARS counselor terminal 4 outputs the company key number which is output to the customer terminal 2 as a caller identification.

Preferably, the ARS counselor terminal 4 includes: a communication module 20 configured to communicate with the customer terminal 2 and the interworking data management server 10; a data transmission application management unit 22 configured to download and update the data transmission applications; an interworking data setting unit 24 configured to register the interworking data to be transmitted to the customer data 2 in advance; a page matching key signal management unit 28 configured to match and manage a key signal to remotely control the page of the interworking data transmitted to the customer terminal 2; an interworking data extraction management unit 30 configured to selectively extract specific interworking data from the interworking data to be transmitted to the customer terminal 2 by the key signal; a data storage unit 34 configured to classify and store the interworking data to be transmitted to the customer terminal 2 in advance; and a control unit 36 configured to control each component, extract and transmit the specific interworking data to be transmitted to the specific customer terminal 2 by the key signal, and control a page output of the interworking data which are output on the screen of the customer terminal 2 by the remote key signal for the page output.

Preferably, the ARS counselor terminal further includes an inter-application communication unit 26 configured to perform communication with applications of the customer terminal 2 by inputting a caller identification (CID) of the customer terminal 2.

Preferably, the ARS counselor terminal 4 further includes a transmission signal generation unit 32 configured to, when the company key number is set in the data transmission applications, control the company key number to be output as the caller identification of the customer terminal 2 upon the transmission of the interworking data.

Preferably, the control unit 36 performs a control to confirm whether the data transmission application is installed in the customer terminal 2 through the communication with the application of the customer terminal 2 by an input of the caller identification (CID) of the customer terminal 2 or by a request to the interworking data management server 10, and transmit the interworking data only when the data transmission application is installed.

According to another aspect of the present invention, there is provided a method for transmitting interworking data in heterogeneous networks, including: a first step of performing a terminating connection with a specific ARS telephone number to set a session with voice communication; a second step of inputting a customer's telephone number to an ARS counselor terminal 4 when transmission of the interworking data is required; a third step of determining whether a data transmission application is installed in a customer terminal 2; a fourth step of receiving a specific interworking data extraction signal; and a fifth step of extracting the interworking data and transmitting the extracted data to the customer terminal 2.

The method may further comprise: prior to the first step, a step of downloading and installing the data transmission applications from an interworking data management server 10 into the customer terminal 2 and the ARS counselor terminal 4.

Preferably, the fifth step is a step of receiving a counseling telephone through a company key number instead of an ARS telephone number and transmitting the interworking data to the customer terminal 2 through a person in charge terminal.

Preferably, in the fourth and fifth steps, the interworking data management server 10 extracts the interworking data by a request of the ARS counselor terminal 4 and transmits the extracted data to the customer terminal 2.

The method may further comprise: a step of converting and transmitting, when it is determined that the data transmission application is not installed in the customer terminal 2 in the third step, the interworking data which are web data into an SMS by the ARS counselor terminal 4.

The method may further comprise: after the fifth step, a step of transmitting a page control approval signal to the customer terminal 2, by the ARS counselor terminal 4; and transmitting a page control signal to the customer terminal 2 to control a screen output based on the approval of the customer, by the ARS counselor terminal 4.

Preferably, the page control signal is a control signal on what number page is output and a display control signal for a text in the page.

Advantageous Effects

According to the present invention, the system and method for transmitting interworking data in heterogeneous networks may transmit complex explanations or data for sentences or words that a customer may confuse using applications through web networks while a counselor talk to a customer on the phone and display these explanations or the data on the customer terminal, such that the counseling convenience may be greatly improved and the counselor may perform the remote output control when the interworking data are a plurality of web pages. Further, the system and method for transmitting interworking data in heterogeneous networks may separately display and control the sentences or the words to be emphasized, thereby greatly improving the convenience.

DESCRIPTION OF DRAWINGS

FIG. 7 is a flow chart illustrating a signal flow of the system for transmitting interworking data in heterogeneous networks according to the embodiment of the present invention.

BEST MODE

Hereinafter, the present invention will be described with reference to the accompanying drawings.

Figure 1:
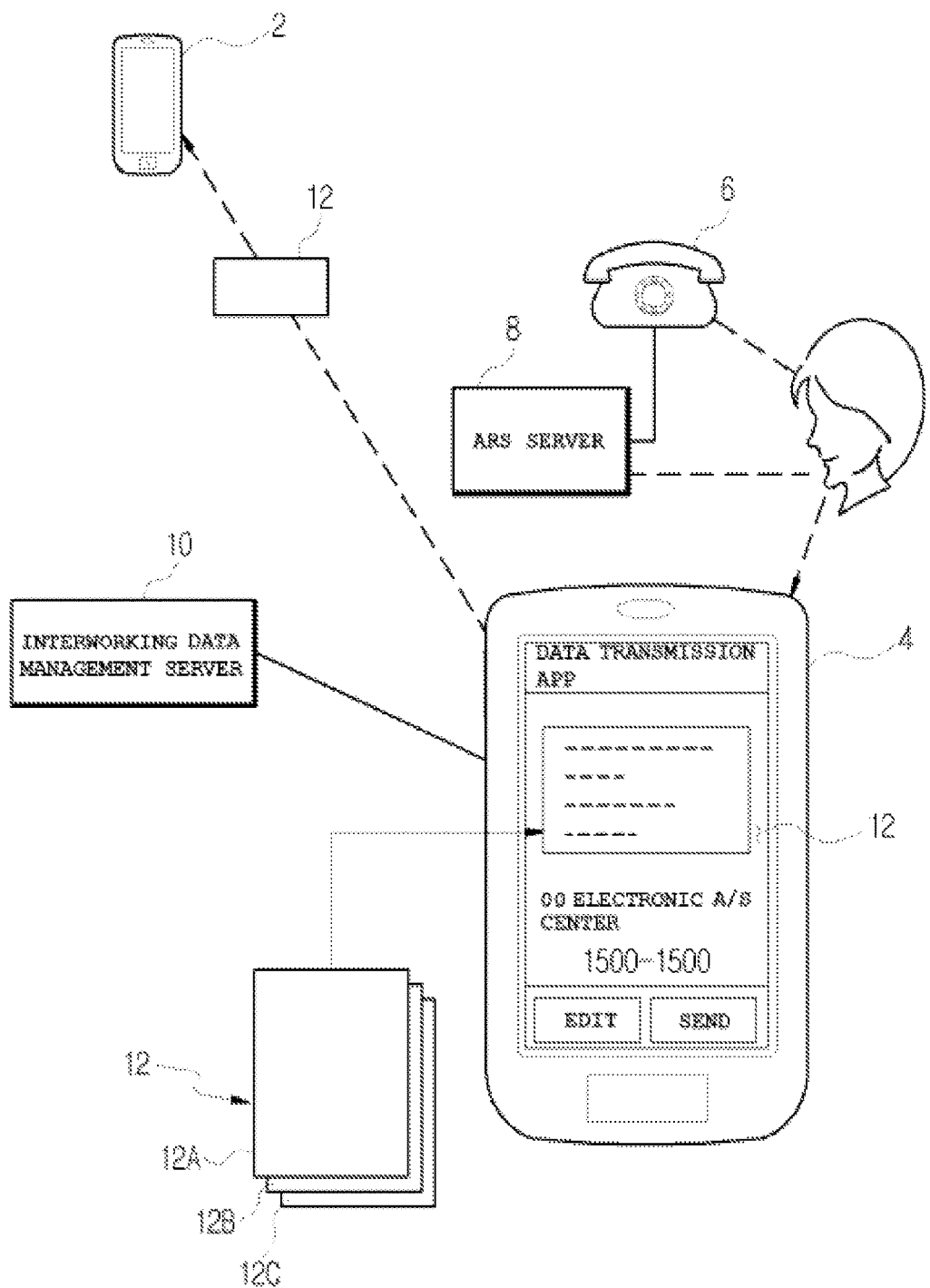
FIG. 1 is a diagram illustrating an interworking data transmission state through a system for transmitting interworking data in heterogeneous networks according to an embodiment of the present invention.
Figure 2:
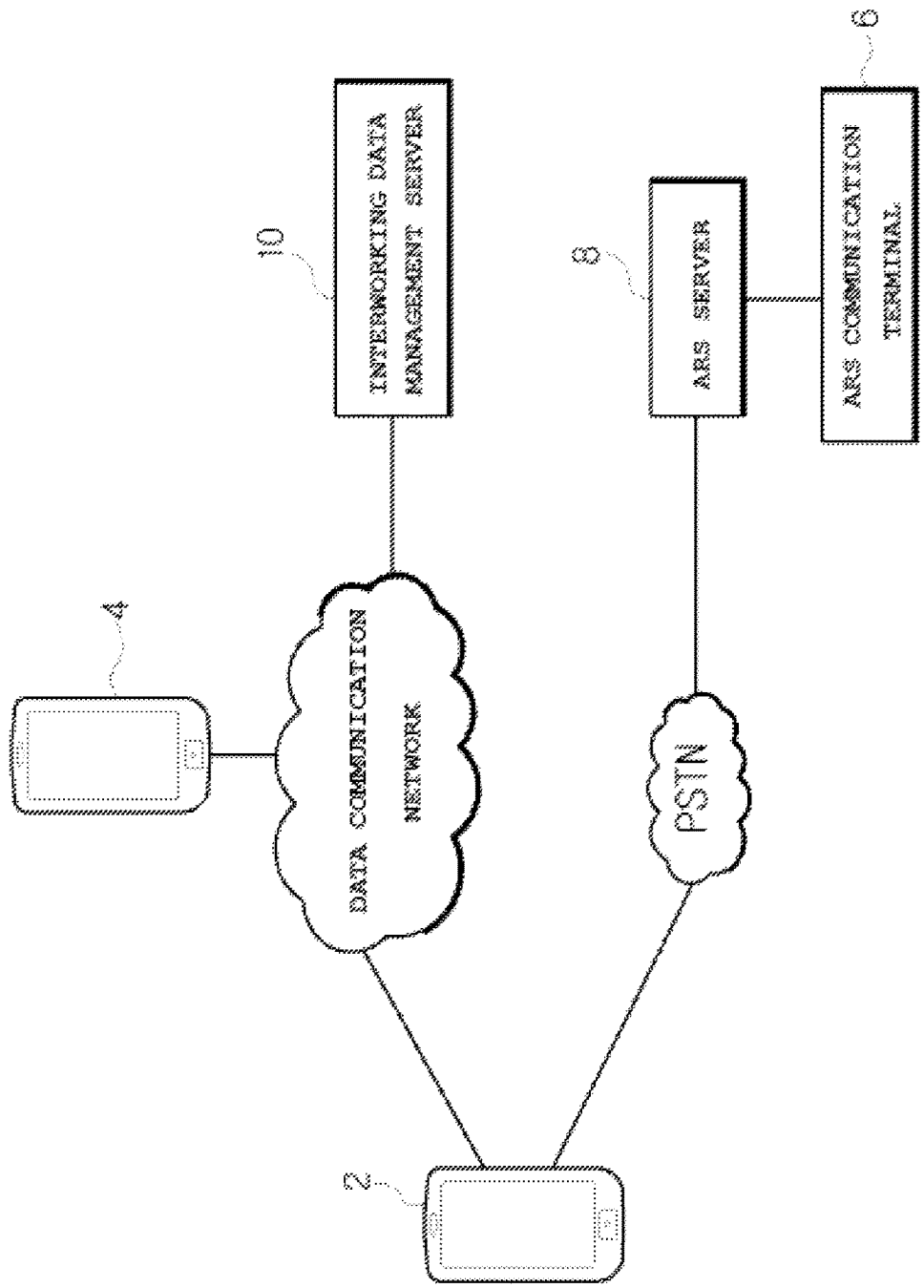
FIG. 2 is a diagram illustrating a schematic configuration of the system for transmitting interworking data in heterogeneous networks according to the embodiment of the present invention.
Figure 3:
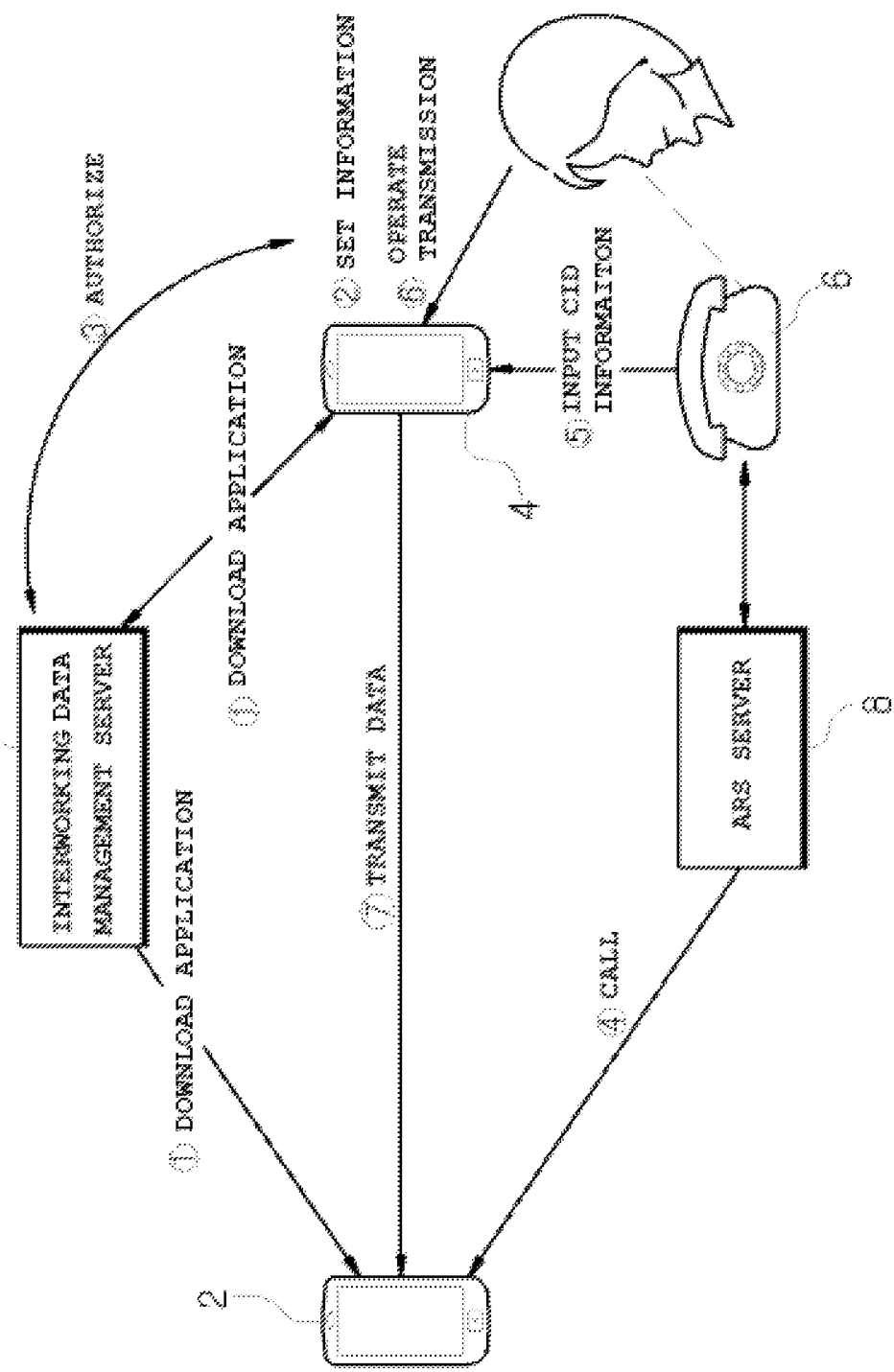
FIG. 3 is a diagram illustrating a data flow state of the system for transmitting interworking data in heterogeneous networks according to the embodiment of the present invention.
Figure 4:
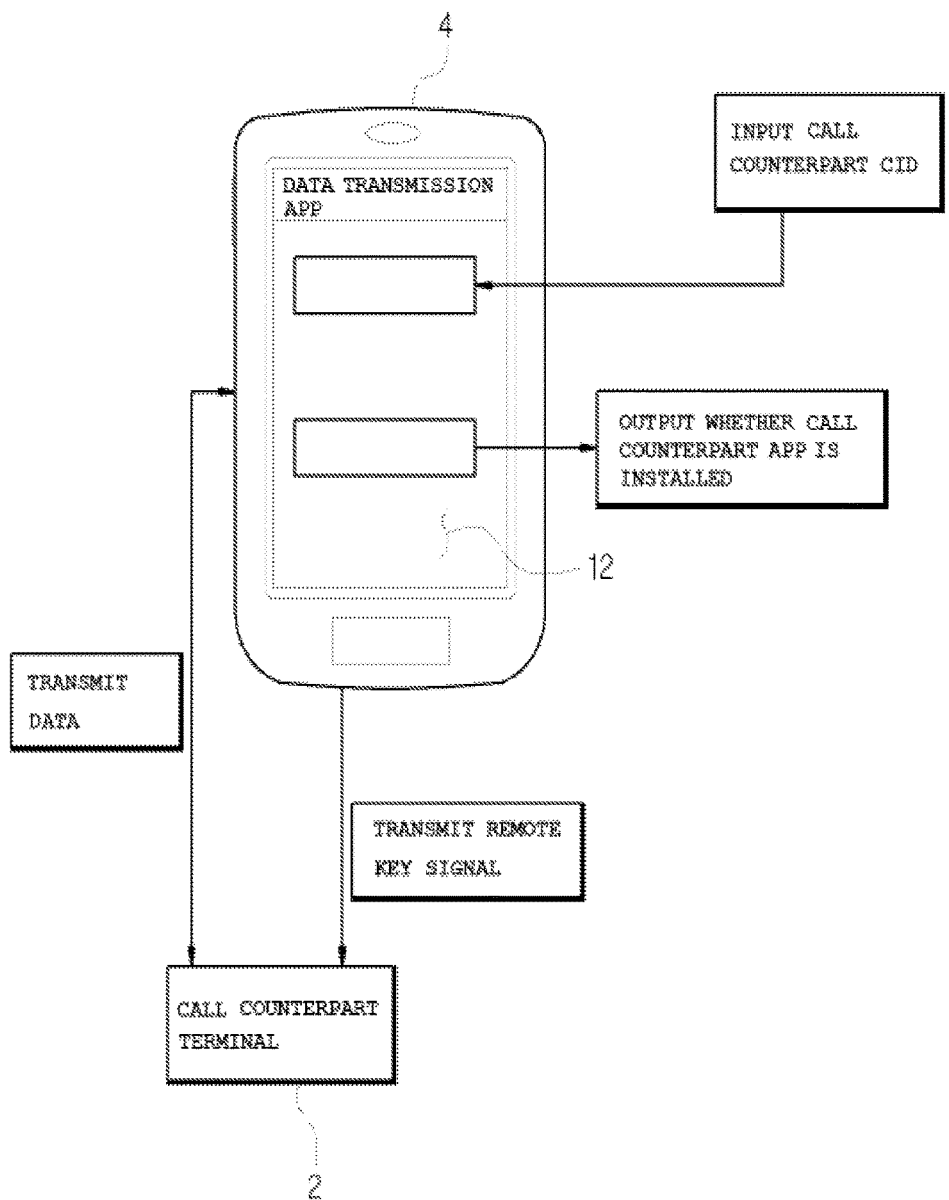
FIG. 4 is a diagram illustrating an input state for data transmission through the system for transmitting interworking data in heterogeneous networks according to the embodiment of the present invention.

FIG. 1 is a diagram illustrating an interworking data transmission state through a system for transmitting interworking data in heterogeneous networks according to an embodiment of the present invention, FIG. 2 is a diagram illustrating a schematic configuration of the system for transmitting interworking data in heterogeneous networks according to the embodiment of the present invention, FIG. 3 is a diagram illustrating a data flow state of the system for transmitting interworking data in heterogeneous networks according to the embodiment of the present invention, and FIG. 4 is a diagram illustrating an input state for data transmission through the system for transmitting interworking data in heterogeneous networks according to the embodiment of the present invention.

Referring to FIGS. 1 to 4, a system for transmitting interworking data in heterogeneous networks according to an embodiment of the present invention is a system capable of greatly improving convenience and reducing counseling time, by downloading and installing data transmission applications to a customer terminal and an ARS counselor terminal, respectively, allowing the ARS counselor to simply select specific data from complex and hard information upon ARS counseling in a state in which he/she sorts and stores in advance information to be transmitted as data upon the ARS counseling and transmit the selected specific data to the customer terminal, and allowing the remote counselor to control a page for the data transmitted to the customer terminal to be output.

In more detail, the system for transmitting interworking data in heterogeneous networks according to the embodiment of the present invention is a system for allowing a counselor counseling with the customer through a voice communication network on an ARS key number or a company key number to operate his/her own terminal, for example, an ARS counselor terminal 4 so as to extract specific interworking data and transmit the extracted data to the customer terminal 2 through a web network and continuously perform voice communication.

The system for transmitting interworking data in heterogeneous networks according to the embodiment of the present invention is used under a situation in which the counselor counseling with the customer through the voice communication network on the ARS key number or the company key number gives an explanation of a complicated product brochure to the customer or an explanation of sentences or words that the customer is hard to pronounce or accurately transmits English, terminologies, abbreviations, or any one of data that which are requested by a predetermined number of users to register as ARS data to a customer.

To this end, the system for transmitting interworking data in heterogeneous networks according to the embodiment of the present invention may include: an ARS server 8 configured to receive a call signal from the customer terminal 2 to connect any one of a plurality of ARS communication terminals 6 to the customer terminal 2; the customer terminal 2 configured to receive interworking data from an ARS counselor terminal 4 to be output on a screen with being connected to the ARS communication terminal 6 on voice communication; the ARS counselor terminal 4 configured to download and install data transmission applications from an interworking data management server 10, store the interworking data to be transmitted to the customer terminal 2 in advance, extract specific data by a data selection signal and transmit the extracted data to the customer terminal 2, and perform a remote output control of the interworking data which are output to the customer terminal 2; and the interworking data management server 10 configured to download and register the data transmission applications and transmit the interworking data 12, which are authorized by a user and transmitted to a call counterpart terminal, to a user terminal.

In this case, the interworking data 12 are data including the company key number, an ARS call telephone number, or a person in charge telephone number and include a plurality of wireless web pages 12A, 12B and 12C.

When the interworking data 12 includes the plurality of wireless web pages 12A, 12B and 12C, the data transmission applications installed in the customer terminal 2 and the data transmission applications installed in the ARS counselor terminal 4 may communicate with each other so that the ARS counselor uses his/her own terminal 4 to output a page to be explained to the customer to the customer terminal 2.

Meanwhile, the interworking data management server 10 may also transmit the interworking data to the customer terminal 2 by the request of the ARS counselor terminal 4.

In particular, the interworking data may be transmitted only when the data transmission applications are installed in both of the ARS counselor terminal 4 which transmits data and the customer terminal 2 which receives the data.

Further, any one terminal (for example, the ARS counselor terminal 4) in which the data transmission applications are installed may confirm whether the data transmission applications are installed in a terminal (for example, the customer terminal 2) which has a specific telephone number. As a result, if the communication between the data transmission applications installed in the respective terminals is performed, it is possible to easily confirm whether the data transmission applications are installed.

Meanwhile, it is possible to confirm whether the data transmission applications are installed based on the download installation information registered in the interworking data management server 10 or the communication of the data transmission application with the interworking data management server 10.

If it is determined that the data transmission application is not installed in the customer terminal 2, the ARS counselor terminal 4 converts and transmits the interworking data which are web data into an SMS.

Further, when the company key number is set, the ARS counselor terminal 4 is configured to output the company key number which is output to the customer terminal 2 as a caller identification.

To this end, in the system for transmitting interworking data in heterogeneous networks according to the embodiment of the present invention, it is assumed that a person in charge terminal is the ARS counselor terminal 4 when the company key number is set, and the caller identification is displayed as the company key number when the customer terminal 2 receives the interworking data from the ARS counselor terminal 4.

That is, the person in charge accesses the interworking data management server 10 using his/her own ARS counselor terminal 4 to download and install the downloaded data transmission applications in the ARS counselor terminal 4. In this state, when the person in charge accesses the interworking data management server 10 to transmit the interworking data 12 using the ARS counselor terminal 4, which is a terminal owned by the person in charge, based on a certificate, etc., the company key number is registered in the data transmission application to be displayed as the caller number.

That is, the data transmission application is a means for changing the caller identification, which may be registered and changed only when it is authorized by the interworking data management server 10.

Further, when the person in charge needs to transmit the interworking data to the customer in the state in which the ARS counselor terminal is connected to the customer terminal 2 through the ARS communication terminal 6 (replaceable by a company key terminal), the person in charge extracts the specific interworking data using the ARS counselor terminal 4 and transmit the extracted data to the customer terminal 2.

In this case, the interworking data may be stored in very different forms. Therefore, it is preferable that the interworking data are classified depending on a classification code, and the person in charge selects the classification code and the unique identification code of data using the ARS counselor terminal 4, and thereby it is possible to rapidly extract the desired data to be transmitted.

Meanwhile, as illustrated in FIG. 4, the ARS counselor terminal 4 may determine whether the data transmission application is installed in the customer terminal 2 using the data transmission application installed therein, while the counselor performs the voice communication with the customer through the ARS communication terminal 6.

That is, under a situation in which the counselor transmits the interworking data, he/she outputs the data transmission application of the ARS counselor terminal 4 on the screen and inputs the customer telephone number acquired by a caller identification (CID) function to a customer telephone number input blank, thereby determining whether the data transmission application is installed in the customer terminal 2.

If it is determined that the data transmission application is installed in the customer terminal 2, the counselor may transmit the data to the customer terminal 2 through the web network and may also transmit the transmitted interworking data independent of the type with enhanced convenience.

In particular, the system for transmitting interworking data in heterogeneous networks according to the embodiment of the present invention may perform a page output control when a plurality of data are included or specific sentences or specific words are displayed while being emphasized, the ARS counselor terminal 4 may use the data transmission application to remotely control the customer terminal 2, such that the counselor may easily counsel or clearly explain to the customer with more enhanced convenience.

Figure 5:
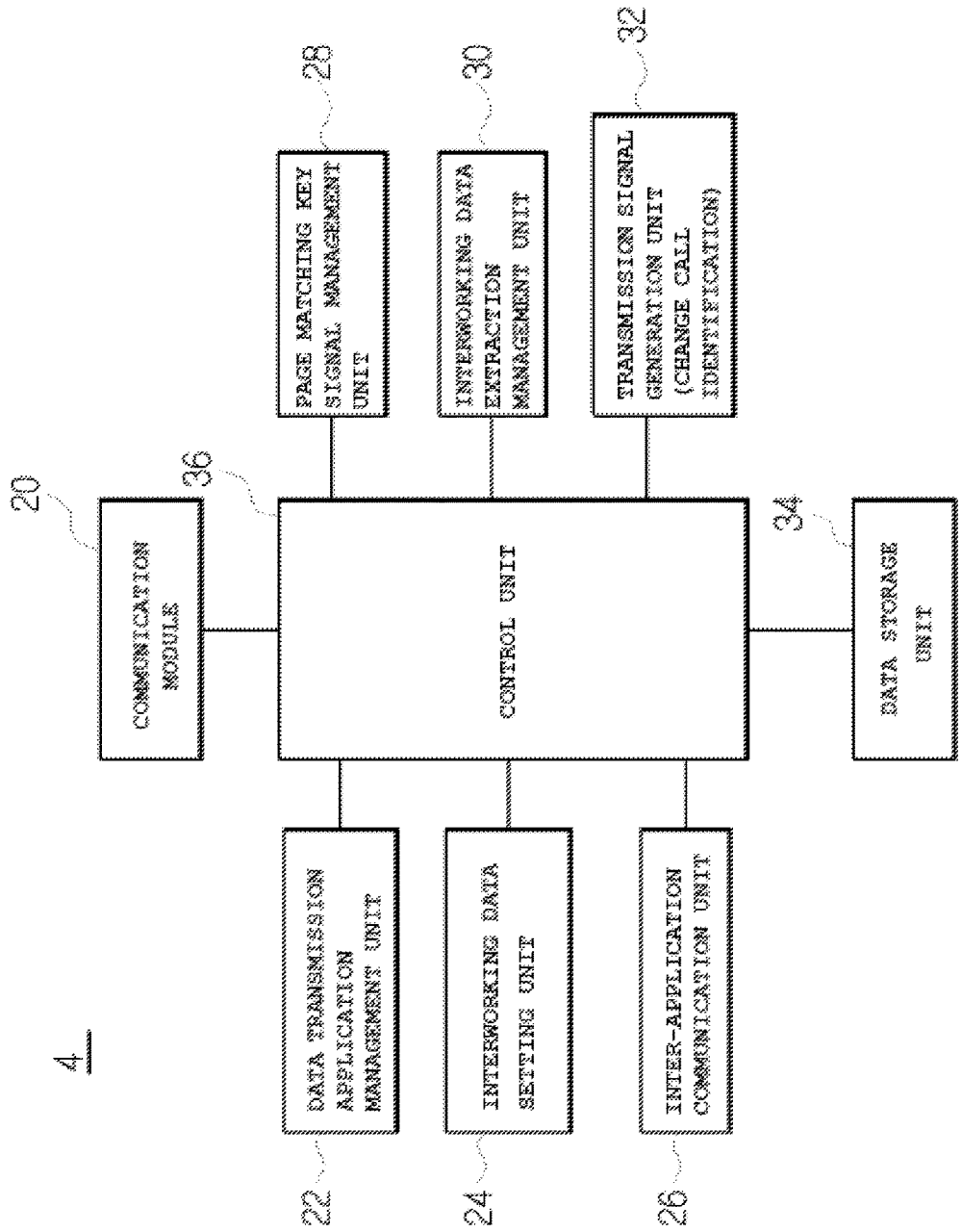
FIG. 5 is a block diagram illustrating a configuration of an ARS counselor terminal included in the system for transmitting interworking data in heterogeneous networks according to the embodiment of the present invention.

FIG. 5 is a block diagram illustrating a configuration of an ARS counselor terminal included in the system for transmitting interworking data in heterogeneous networks according to the embodiment of the present invention.

Referring to FIG. 5, the ARS counselor terminal 4 included in the system for transmitting interworking data in heterogeneous networks according to the embodiment of the present invention includes: a communication module 20 configured to communicate with the customer terminal 2 and the interworking data management server 10; a data transmission application management unit 22 configured to download and update the data transmission application; an interworking data setting unit 24 configured to register the interworking data to be transmitted to the customer data 2 in advance; a page matching key signal management unit 28 configured to match and manage a key signal to remotely control the page of the interworking data transmitted to the customer terminal 2; an interworking data extraction management unit 30 configured to selectively extract specific interworking data from the interworking data to be transmitted to the customer terminal 2 by the key signal; a data storage unit 34 configured to classify and store the interworking data to be transmitted to the customer terminal 2 in advance; and a control unit 36 configured to control each component, extract and transmit the specific interworking data to be transmitted to the specific customer terminal 2 by the key signal, and control a page output of the interworking data which are output on the screen of the customer terminal 2 by the remote key signal for the page output.

Meanwhile, the ARS counselor terminal further includes an inter-application communication unit 26 configured to perform communication with applications of the customer terminal 2 by inputting the caller identification (CID) of the customer terminal 2.

Further, the ARS counselor terminal 4 further include a transmission signal generation unit 32 configured to, when the company key number is set in the data transmission application, control the company key number to be output as the caller identification of the customer terminal 2 upon the transmission of the interworking data.

Meanwhile, the control unit 36 performs a control to confirm whether the data transmission application is installed in the customer terminal 2 through the communication with the application of the customer terminal 2 by the input of the caller identification (CID) of the customer terminal 2 or by a request to the interworking data management server 10, and transmit the interworking data only when the data transmission application is installed.

Figure 6:
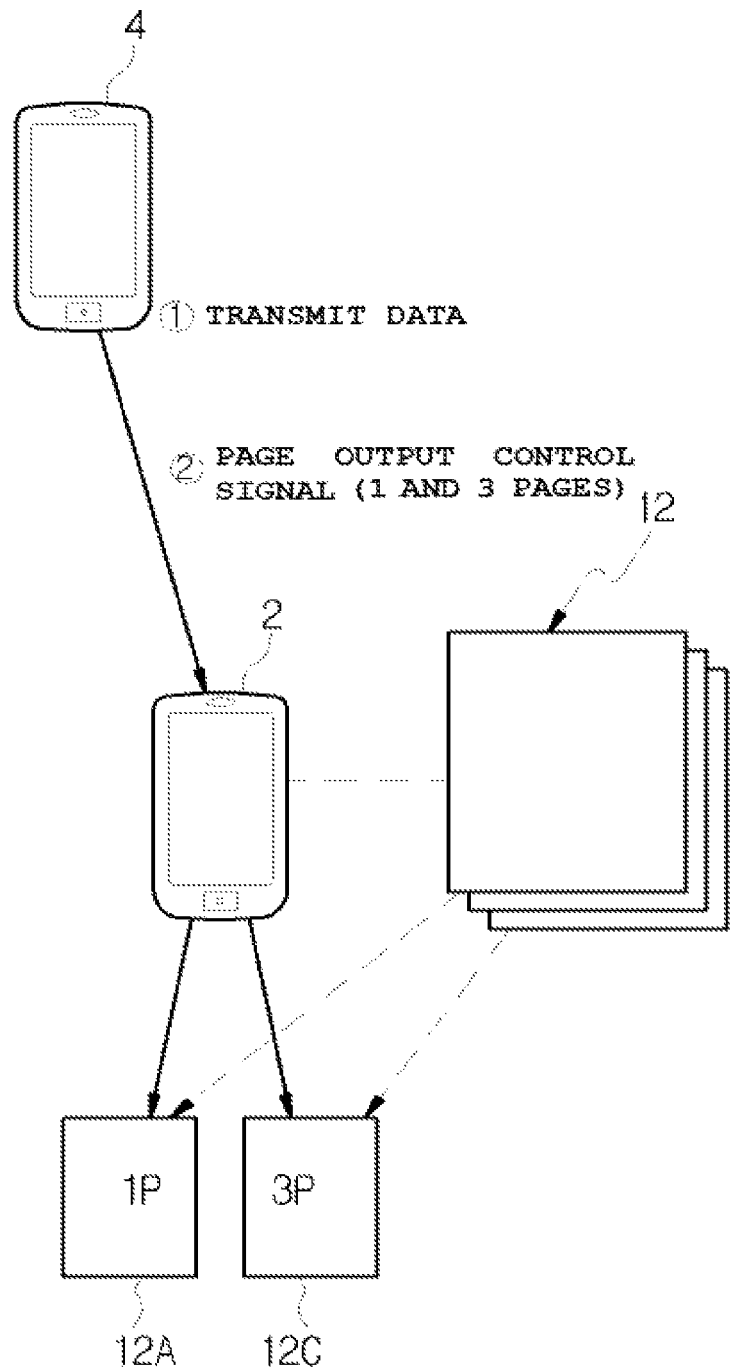
FIG. 6 is a diagram illustrating a page output remote control state of interworking data through the system for transmitting interworking data in heterogeneous networks according to the embodiment of the present invention.

FIG. 6 is a diagram illustrating a page output remote control state of interworking data through the system for transmitting interworking data in heterogeneous networks according to the embodiment of the present invention.

Referring to FIG. 6, in order to remotely control the page output of the interworking data using the system for transmitting interworking data in heterogeneous networks according to the embodiment of the present invention, the interworking data may be transmitted to the remote customer terminal 2 using the ARS counselor terminal 4, and the web page of the screen output to the customer terminal 2 may be controlled using the ARS counselor terminal 4.

The remote control is performed by the communication between the data transmission application installed in the ARS counselor terminal 4 and the data transmission application installed in the customer terminal 2.

Meanwhile, the page output remote control of the interworking data using the system for transmitting interworking data in heterogeneous networks according to the embodiment of the present invention includes various remote displays for underlining or emphasizing specific sentences or words of the interworking data which are output on the screen of the customer terminal 2.

A function and an operation of the system for transmitting interworking data in heterogeneous networks according to the embodiment of the present invention configured as described above will be described in detail with reference to the accompanying drawings.

FIG. 7 is a flow chart illustrating a signal flow of the system for transmitting interworking data in heterogeneous networks according to the embodiment of the present invention.

First, the data transmission applications are downloaded from the interworking data management server 10 to be installed in the customer terminal 2 and the ARS counselor terminal 4. Preferably, the interworking data management server 10 attaches unique identification codes to the respective data transmission applications.

In this state, if it is determined that the interworking data transmission is required upon the determination of the counselor while the voice communication between the counselor and the customer is made by performing the terminating connection between the ARS counselor terminal 4 and the customer terminal 2 with a specific ARS telephone number to set a session with the voice communication, the counselor inputs the customer's telephone number to the ARS counselor terminal 4.

Then, the ARS counselor terminal 4 determines whether the data transmission application is installed in the customer terminal 2.

If the data transmission application is installed, the ARS counselor terminal 4 receives a specific interworking data extraction signal to extract the interworking data and transmit the extracted data to the customer terminal 2.

In this case, the ARS counselor terminal may receive a counseling telephone through the company key number instead of the ARS telephone number, and transmit the interworking data to the customer terminal 2 through the person in charge terminal.

In addition, the interworking data management server 10 may extract the interworking data by the request of the ARS counselor terminal 4, and transmit the extracted interworking data to the customer terminal 2.

Further, when the data transmission application is not installed in the customer terminal 2, the ARS counselor terminal 4 may convert and transmit the interworking data which are the web data into the SMS.

In this state, the counselor may transmit a page control approval signal to the customer terminal 2 using the ARS counselor terminal 4, and the ARS counselor terminal 4 transmits the page control signal to the customer terminal 2 by the approval of the customer to control the screen output.

In this case, the page control signal is a control signal on what number page is output, and a display control signal for a text in the page.

That is, the function of displaying the specific words or sentences in the page is performed, such that the counselor may very conveniently give an explanation to the customer.

Meanwhile, the system and method for transmitting interworking data in heterogeneous networks according to the embodiment of the present invention are not limited to the above-described embodiments, and it will be understood by those skilled in the related art that various modifications and variations may be made therein without departing from the scope of the present invention as defined by the appended claims.

The invention claimed is:

1. A system for transmitting interworking data in heterogeneous networks, comprising:
    an Automatic Response System (ARS) server configured to receive a call signal from a customer terminal to connect at least one of a plurality of ARS communication terminals to the customer terminal;
    the customer terminal configured to receive interworking data from an ARS counselor terminal and output the interworking data on a screen while the customer terminal is being connected to the ARS communication terminal on voice communication;
    the ARS counselor terminal configured to download and install data transmission applications from an interworking data management server, store the interworking data to be transmitted to the customer terminal in advance, extract specific data from the interworking data in response to a data selection signal, transmit the specific data to the customer terminal, transmit a request for approval of a page control to the customer terminal and, upon receipt of the approval of the page control from the customer terminal, perform a remote control of the interworking data which are being displayed on the customer terminal; and
    the interworking data management server configured to register the data transmission applications to be downloaded, and register the interworking data, which are transmitted to a terminal of a user upon authorization of the user,
    wherein the interworking data management server is configured to transmit the interworking data to a customer terminal in response to a request from the ARS counselor terminal,
    wherein a terminal with the data transmission applications installed therein is configured to confirm whether the data transmission applications are installed in the terminal based on at least one of download installation information registered in the interworking data management server and a communication between the data transmission applications and the interworking data management server, and
    wherein the interworking data management server attaches an identification to each of the data transmission applications when each of the data transmission applications is registered and a change in the identification is authorized only by the interworking data management server.

2. The system of claim 1, wherein the interworking data include at least one of English, terminologies, abbreviations, product brochures, or data which are requested by a predetermined number of users to register as ARS data.

3. The system of claim 1, wherein the interworking data include a company key number, an ARS call telephone number, or a telephone number of a person in charge.

4. The system of claim 1, wherein the interworking data include a plurality of wireless web pages.

5. The system of claim 1, wherein the interworking data are transmitted only when the data transmission applications are installed in both of the ARS counselor terminal which transmits the interworking data and the customer terminal which receives the interworking data.

6. The system of claim 1, wherein at least one of the terminals in which the data transmission applications are installed confirms whether the data transmission application is installed in a terminal which has a specific telephone number.

7. The system of claim 1, wherein if it is determined that the data transmission application is not installed in the customer terminal, the ARS counselor terminal converts and transmits the interworking data which are web data into an SMS message.

8. The system of claim 1, wherein, when the company key number is set, the ARS counselor terminal outputs the company key number which is output to the customer terminal as a caller identification.

9. The system of claim 1, wherein the ARS counselor terminal comprises: a communication hardware module configured to communicate with the customer terminal and the interworking data management server; a data transmission application management hardware unit configured to download and update the data transmission applications; an interworking data setting hardware unit configured to register the interworking data to be transmitted to the customer data in advance; a page matching key signal management hardware unit configured to match and manage a key signal to remotely control the page of the interworking data transmitted to the customer terminal; an interworking data extraction management hardware unit configured to selectively extract specific interworking data from the interworking data to be transmitted to the customer terminal by the key signal; a data storage hardware unit configured to classify and store the interworking data to be transmitted to the customer terminal in advance; and a control hardware unit configured to control each component, extract and transmit the specific interworking data to be transmitted to the specific customer terminal by the key signal, and control a page output of the interworking data which are output on the screen of the customer terminal by the remote key signal for the page output.

10. The system of claim 9, wherein the ARS counselor terminal further comprises an inter-application communication hardware unit configured to perform communication with applications of the customer terminal by inputting a caller identification (CID) of the customer terminal.

11. The system of claim 9, wherein the ARS counselor terminal further comprises a transmission signal generation hardware unit configured to, when the company key number is set in the data transmission applications, control the company key number to be output as the caller identification of the customer terminal upon the transmission of the interworking data.

12. The system of claim 9, wherein the control hardware unit performs a control to confirm whether the data transmission application is installed in the customer terminal through the communication with the application of the customer terminal by an input of the caller identification (CID) of the customer terminal or by a request to the interworking data management server, and transmit the interworking data only when the data transmission application is installed.

13. A method for transmitting interworking data in heterogeneous networks, comprising:
    a first step of downloading and installing data transmission applications from an interworking data management server into a customer terminal and an Automatic Response System (ARS) counselor terminal;
    a second step of performing a connection with a specific Automatic Response System (ARS) telephone number to set a session with voice communication;
    a third step of inputting a customer's telephone number to the ARS counselor terminal when transmission of the interworking data is required;
    a fourth step of determining whether a data transmission application is installed in the customer terminal;
    a fifth step of receiving a specific interworking data extraction signal;
    in response to the specific interworking data extraction signal, a sixth step of extracting the interworking data and transmitting the extracted data to the customer terminal by the interworking data management server;
    a seventh step of transmitting a signal that requests an approval of a page control to the customer terminal, by the ARS counselor terminal; and
    when a customer approves the page control, an eighth step of transmitting a page control signal to the customer terminal to control a screen output on the customer terminal by the ARS counselor terminal.

14. The method of claim 13, wherein the sixth step is a step of receiving a counseling telephone through a company key number instead of an ARS telephone number and transmitting the extracted data to the customer terminal through a terminal of a person in charge.

15. The method of claim 13, further comprising: a step of converting and transmitting, when it is determined that the data transmission application is not installed in the customer terminal in the fourth step, the interworking data which are web data into an SMS message by the ARS counselor terminal.

16. The method of claim 13, wherein the page control signal includes a control signal on what number page is output on the customer terminal and a control signal on a display of a text in the page corresponding to the page number.

* * * * *